United States Patent
Williams et al.

(10) Patent No.: US 9,415,844 B2
(45) Date of Patent: Aug. 16, 2016

(54) MULTIPURPOSE RECREATIONAL DEVICE

(71) Applicants: Zackary Scott Williams, Franklin, NC (US); Stephen Marshall White, Franklin, NC (US)

(72) Inventors: Zackary Scott Williams, Franklin, NC (US); Stephen Marshall White, Franklin, NC (US)

( * ) Notice: Subject to any disclaimer, the term of this patent is extended or adjusted under 35 U.S.C. 154(b) by 0 days.

(21) Appl. No.: 14/467,318

(22) Filed: Aug. 25, 2014

(65) Prior Publication Data
US 2016/0194062 A1  Jul. 7, 2016

Related U.S. Application Data

(60) Provisional application No. 61/869,912, filed on Aug. 26, 2013.

(51) Int. Cl.
| B63B 35/79 | (2006.01) |
| B63B 35/73 | (2006.01) |
| B62B 17/00 | (2006.01) |

(52) U.S. Cl.
CPC ............... B63B 35/73 (2013.01); B62B 17/005 (2013.01); *B63B 2035/7903* (2013.01)

(58) Field of Classification Search
CPC ............ B63B 35/79; B63B 2035/7903; B63B 35/7906; B63B 35/7933; B63B 35/81; B63B 2035/818; B62B 17/00
See application file for complete search history.

(56) References Cited

U.S. PATENT DOCUMENTS

| 4,437,842 | A | * | 3/1984 | Connor | ............... B63B 35/7906 441/65 |
| 4,603,870 | A | * | 8/1986 | Monreal | ............... B62B 17/068 280/18 |
| 4,946,412 | A | * | 8/1990 | Maruo | .................. A63B 31/00 114/66 |
| D315,387 | S | * | 3/1991 | Warren | ........................ D12/307 |
| 2012/0156950 | A1 | * | 6/2012 | Masters | ................. B63B 35/79 441/74 |

* cited by examiner

*Primary Examiner* — S. Joseph Morano
*Assistant Examiner* — Andrew Polay

(57) ABSTRACT

A multipurpose recreational device designed to be ridden in the prone, kneeling, or seated position. The craft is generally shaped like the front and mid-section of a kayak that was cut in half perpendicular to the longitudinal axis of the craft. The craft is made of a one or more piece construction having a rocker bow in the front so as to ride up on a wave without nosediving. The craft has a displacement hull so the rider can easily maneuver on any water covered surface; liquid or frozen. The craft contains a head cavity/recess in the bow for head protection and can additionally be used for emergency breathing while upside down in the water. The bow also contains vertical handles covered on top by integrated shoulder braces.

2 Claims, 2 Drawing Sheets

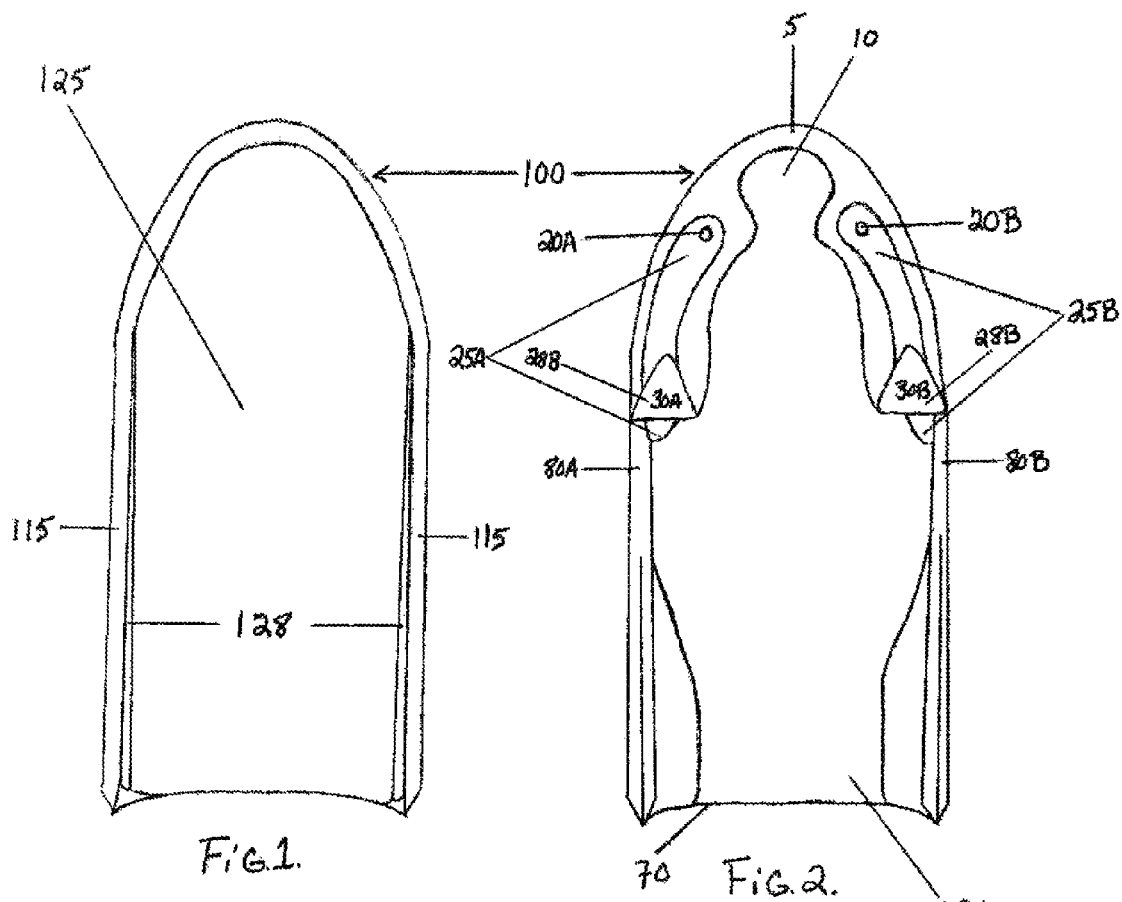
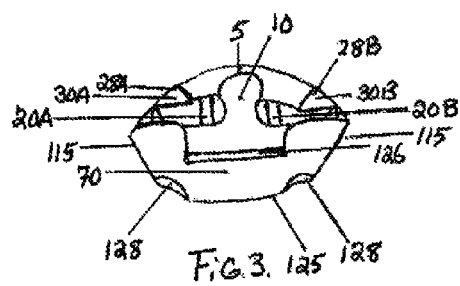
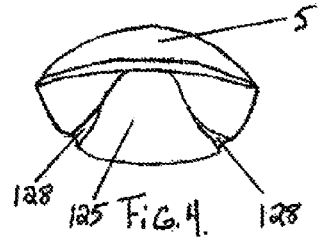

MULTIPURPOSE RECREATIONAL DEVICE

CROSS REFERENCE TO RELATED APPLICATIONS

This application claims the benefit of provisional patent application Ser. No. 61/869,912 filed 2013 Aug. 26 by the present inventors

FIELD OF THE INVENTION

The invention relates to the field of recreational apparatuses for individuals to use in the water or in the snow with their bodies on or within the device and the bottom of the device skimming across the surface of water or snow.

BACKGROUND

Numerous individuals enjoy participating in sports and recreational activities that involve riding atop an apparatus that supports the individual in either water or snow. Older embodiments of these kinds of devices include skis, sleds, and toboggans for snow as well as water skis, surf boards, skimming boards, and "boogie boards" for water.

Examples of prior devices are included in the following publications:
U.S. Patent Application Publication No. 20080116619
U.S. Patent Application Publication No. 20120156950
U.S. Pat. No. 8,435,092
U.S. Pat. No. 7,438,618
U.S. Pat. No. 6,935,909
U.S. Pat. No. 5,797,779
U.S. Pat. No. 5,618,215
U.S. Pat. No. 4,964,825
U.S. Pat. No. 4,619,619

A need exists in the art of recreational devices for an apparatus that provides a more exciting experience and that can be used in either snow or water.

BRIEF SUMMARY OF THE INVENTION

The recreational device disclosed herein includes a multipurpose, primarily aquatic apparatus (i.e., River Board, Knee Board, Boogie Board, Stand Up Board, Wake Board, Kite Board), but can be used on land in certain conditions as a toboggan/sled. The apparatus consists of a rocker bow trailing into a displacement hull with chined edges going down both sides along the length of the device and varying in length from approximately 24" to 64." The device has a head cavity/recess located in the bow for head protection, and the operator can place his or her head in the cavity of the bow when a chance of danger to head injury is possible. The head cavity also traps a pocket of air that can be used when rider is upside down in water for momentary breathing. The device has vertical hand grips located under cover of the bow. The device has shoulder braces at the end of the top side of the bow so that rider can place shoulders against braces for added support in rough conditions or to be used for bracing when changing position on device.

In one embodiment, the device has 4"-8" side walls flaring out at an angle, with a diameter of 1"-12" wide. The device can be constructed out of wood, fiberglass, carbon fiber, foam or plastics of varying composition. The device has padding in various areas for rider comfort. Multiple attachments/accessories are possible to be used with this recreational device including, but not limited to the following:

(i) Seat insert & strap in foot blocks that will enable rider to use the device as a toboggan or sled in frozen precipitation.
(ii) Foot straps will be able to be mounted on the inside top surface of the device in multiple locations to be used during wake boarding, kite boarding & wave skating.
(iii) Multiple metal handles will be located on the device for securing leashes & tethers, and also can be used to secure the device for transport.
(iv) Device will have an optional sail that attaches to the device by tether.
(v) Device will have water & air tight dry storage compartments located in/on the device.
(vi) Device will have an optional collapsible paddle that will fit into one of the dry storage compartments.
(vii) Optional goggles with integrated nose plug.
(viii) Optional swim fins with a short semi rigid fin area and shoe like bottom.
(ix) Optional personal floatation device that uses compressed air cylinders to inflate for floatation when needed.
(xii) Optional straps for caring the device like a backpack.

BRIEF DESCRIPTION OF THE FIGURES

FIG. 1 is a bottom view of the recreational device disclosed herein.
FIG. 2 is a top cross section view of the recreational device disclosed herein.
FIG. 3 is a rear view of the recreational device disclosed herein.
FIG. 4 is a front view of the recreational device disclosed herein.

DETAILED DESCRIPTION

Figure 5:
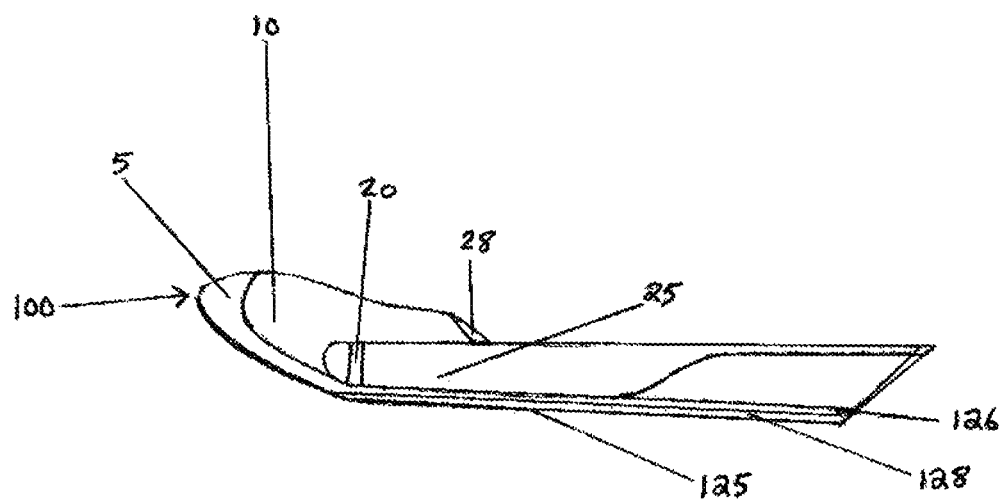
FIG. 5 is a side cross section view of the recreational device disclosed herein.

The figures illustrate a multipurpose recreational device (100) that is suitable for use in either water or snow and ice. The recreational device includes a displacement hull (125) that has a sufficiently low coefficient of friction to allow for gliding across a surface, such as a hill covered with snow or ice, and for riding through water of varying depths. The device has a level of buoyancy allowing for use as a floating device, so that the device can be propelled through running water by waves or rapids, propelled by the user's arms and legs paddling in the water, or even pulled by a motorized watercraft, such as a boat or jet ski.

The structure of the recreational device (100) provides for a multitude of positions for the user therein. FIG. 1 shows an outer view of the hull (125) of the recreational device with sides (115) extending upwardly from the outer bottom surface of the hull (125). The bottom region of the hull may include chined edges (128) for additional efficiency during use. FIG. 2 shows the sides of the craft terminate at the upper edges (80A, 80B) which, in one embodiment, are smoothly rounded so that a user can comfortably extend his arms over the sides (80A, 80B) and paddle the recreational device through water while lying within the device with the user's stomach on the inside bottom surface (60). Continuing with FIG. 2, the recreational device (100) is characterized in part by a bow structure (5) that extends from the front of the craft (100) to an intermediate position along the sides (80A, 80B) of the device (100). The bow (5) provides protection for the user when the user lies within or sits within the recreational device. The aerodynamic shape and curvature of the bow (5) promotes a fast propulsion of the exposed surface through ambient air when the hull (FIG. 1, Ref. No. 125) is at least partially submerged in water or snow or gliding across ice during use. FIG. 2 also shows exemplary details of one embodiment of the interior of the recreational device (100). The device extends from a rocker bow (5) to a stern (70), and the dimensions of the interior may be modified so that the recreational device is comfortable for all users of varying ages, shapes and sizes. The craft is suitable for either lying face and torso downward toward the inside bottom surface (60) or with the user's knees tucked under the user facing the rocker bow (5) of the craft. These different positions allow for diverse uses in water, snow, and ice.

The device (100) includes convenient contours defining regions of the device that house the user's body parts and allow for safe handling. For example, at the bow (5) of the apparatus (100), a front contour defines a head cavity/recess (10) for the user to safely tuck his or her head when traversing dangerous areas. The user lies on the device (100) with the user's stomach on the inside bottom surface (60), and the device allows for the user to place his or her face downward into the head cavity/recess (10) for protection. The head cavity/recess also traps a pocket of air that can be used for momentary breathing when the rider is upside down in the water. Of course the open nature of the interior of the device allows for the user to lift his or her head upwardly at any time to see the surroundings. When the user selects this position for riding the craft across water, waves, rapids, snow, or ice, the device (100) also provides handles (20A, 20B) so that the user has a mechanism for stabilizing the body and maintaining a desired position in the recreational device (100). The handles (20A, 20B) are secured between the inside bottom surface (60) of the craft and the bow (5) that extends over the front sides of the craft.

One embodiment of the unit includes an appropriately dimensioned recesses (25A, 25B) which provides a protective and comfortable region for the user to position the elbows when the user grips the handles (20A, 20B). Additional upper pads (30A, 30B) are attached to contours of the device that define shoulder braces (28A, 28B) and provide comfort for the user's shoulders.

As noted previously, the recreational device (100) may be used for sports that are more efficiently enjoyed in a kneeling position in which the rider tucks his bent legs underneath himself and grips the sides (80A, 80B). In one embodiment, the craft may include adjustable positions for either the handles (20A, 20B) or the shapes of the contours that establish the elbow rests (25A, 25B). By adjusting this region of the device, the user may choose to slide his or her knees into the recesses that previously housed arms and elbows when the user was in a prone position.

The figures included herein provide example views of one embodiment of the recreational device. The figures illustrate one embodiment of the recreational device made of layers of fiberglass and micro-cell foam (126), but numerous materials including but not limited to wood, carbon fiber, plastic resin, etc. can be used in manufacturing the device and are within the scope of this disclosure.

The figures illustrate one embodiment of the craft constructed in a one piece design but can be constructed in multiple sections that can be fashioned together in any desirable configuration.

As mentioned heretofore, it should be understood that the craft may be used in any kind of water liquid or frozen, including but not limited to, oceans, rivers, lakes, creeks, snow covered hill sides, or even as a swimming aid in a swimming pool. Further, although the craft is designed for a person to ride on there stomach, it should be understood that a rider can position him or her self in any desired fashion on or within the craft.

We claim:

1. A multipurpose recreational device with a head cavity located in the bow for head protection comprising:
    a hull with an inside bottom surface, an outside bottom surface, a rocker bow, and a left side that is substantially parallel to a right side, each left and right side terminate in upper edges;
    a bow structure comprising:
    a cover extending between a top of the rocker bow and the upper edges of each right and left side, the cover extends to at an intermediate position along the sides, the cover terminates at the intermediate position along the upper edges of the sides, wherein the cover is configured to allow an operator is to place his or her arms between a bottom surface of the cover and the inside bottom surface when the user is in a prone position on the inside bottom surface;
    a pair of vertical handles that extend between the bottom surface of the cover and the inside bottom surface;
    a front contour that defines a head cavity within the cover configured to allow an operator in the prone position on the inside bottom surface to place his or her head within the head cavity and to lift his or her head above the cover while remaining in the prone position on the inside bottom surface.

2. The multipurpose recreational device of claim 1 further comprising:
    a left shoulder brace made of a pad attached on an aft portion of the cover adjacent the left side, and a right shoulder brace made of a pad attached on an aft portion of the cover adjacent the right side.

* * * * *